United States Patent
Noh et al.

(10) Patent No.: US 10,356,723 B2
(45) Date of Patent: Jul. 16, 2019

(54) METHOD AND DEVICE FOR RECEIVING SIGNAL IN WIRELESS ACCESS SYSTEM SUPPORTING FDR TRANSMISSION

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 15/310,659

(22) PCT Filed: May 13, 2015

(86) PCT No.: PCT/KR2015/004795
§ 371 (c)(1),
(2) Date: Nov. 11, 2016

(87) PCT Pub. No.: WO2015/174733
PCT Pub. Date: Nov. 19, 2015

(65) Prior Publication Data
US 2017/0078971 A1 Mar. 16, 2017

Related U.S. Application Data

(60) Provisional application No. 61/992,845, filed on May 13, 2014, provisional application No. 62/027,789, filed on Jul. 23, 2014.

(51) Int. Cl.
*H04W 52/08* (2009.01)
*H04W 88/08* (2009.01)
(Continued)

(52) U.S. Cl.
CPC ............... *H04W 52/08* (2013.01); *H04L 5/14* (2013.01); *H04W 52/10* (2013.01);
(Continued)

(58) Field of Classification Search
CPC ........ H04L 5/14; H04W 52/08; H04W 52/10; H04W 52/146; H04W 52/243;
(Continued)

(56) References Cited

U.S. PATENT DOCUMENTS

2010/0142415 A1* 6/2010 Yu ..................... H04B 7/15578
370/279
2013/0194984 A1* 8/2013 Cheng ................. H04W 72/082
370/294
(Continued)

FOREIGN PATENT DOCUMENTS

| KR | 1020070059873 A | 6/2007 |
| KR | 1020100031417 A | 3/2010 |
| KR | 1020120047337 A | 5/2012 |

*Primary Examiner* — Rina C Pancholi
(74) *Attorney, Agent, or Firm* — Dentons US LLP

(57) ABSTRACT

The present invention relates to a wireless access system supporting a full duplex radio (FDR) transmission environment. The method for a terminal to control uplink transmission power in a wireless access system supporting an FDR, according to an embodiment of the present invention, comprises the steps of: transmitting, to a terminal, power control information on uplink transmission power; and receiving an uplink signal transmitted on the basis of the power control information. The power control information may be determined on the basis of the maximum transmission power of the terminal, the open loop or closed loop power control factor, and a function having as a variable self-interference (SI) value of the base station due to the FDR.

10 Claims, 10 Drawing Sheets

(51) Int. Cl.
*H04W 52/14* (2009.01)
*H04W 52/24* (2009.01)
*H04L 5/14* (2006.01)
*H04W 52/10* (2009.01)
*H04W 52/36* (2009.01)
*H04W 72/04* (2009.01)

(52) U.S. Cl.
CPC ....... *H04W 52/146* (2013.01); *H04W 52/243* (2013.01); *H04W 52/367* (2013.01); *H04W 72/0473* (2013.01); *H04W 88/08* (2013.01)

(58) Field of Classification Search
CPC ... H04W 52/367; H04W 52/14; H04W 52/24; H04W 52/30; H04W 72/0473; H04W 88/08
See application file for complete search history.

(56) References Cited

U.S. PATENT DOCUMENTS

| | | | | |
|---|---|---|---|---|
| 2014/0078939 A1* | 3/2014 | Shirani-Mehr | ....... | H04W 52/24 370/277 |
| 2015/0327293 A1* | 11/2015 | Luo | ...................... | H04W 72/12 370/252 |
| 2017/0302337 A1* | 10/2017 | Liu | ........................ | H04B 7/005 |

* cited by examiner

FIG. 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(a)

(b)

METHOD AND DEVICE FOR RECEIVING SIGNAL IN WIRELESS ACCESS SYSTEM SUPPORTING FDR TRANSMISSION

This application is a National Stage Application of International Application No. PCT/KR2015/004795, filed on May 13, 2015, which claims the benefit of U.S. Provisional Application No. 61/992,845, filed on May 13, 2014 and U.S. Provisional Application No. 62/027,789, filed on Jul. 23, 2014, all of which are hereby incorporated by reference in their entirety for all purposes as if fully set forth herein.

TECHNICAL FIELD

The present invention relates to a wireless access system supporting a full duplex radio (FDR) transmission environment, and more particularly, to a resource allocation method for efficiently receiving a signal when FDR is applied and device for supporting the same.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency-division multiple access (SC-FDMA) system.

DISCLOSURE OF THE INVENTION

Technical Task

One object of the present invention is to provide resource allocation methods for efficiently transmitting and receiving data in a wireless access system supporting FDR transmission.

Another object of the present invention is to provide devices for supporting the above methods.

The technical objects that can be achieved through the present invention are not limited to what has been particularly described hereinabove and other technical objects not described herein will be more clearly understood by persons skilled in the art from the following detailed description.

Technical Solutions

In one technical aspect of the present invention, provided herein is a method of controlling an uplink transmit power by an evolved node B (eNB) in a wireless access system supporting full duplex radio (FDR), including: transmitting power control information on the uplink transmit power to a user equipment (UE); and receiving an uplink signal transmitted based on the power control information. In this case, the power control information may be determined according to a function having as a variable a self-interference (SI) value of the eNB due to the FDR, a maximum transmit power of the UE, and an open-loop or closed-loop power control factor.

The power control information may be determined by Equation A.

$$\text{Allocated power} = \min\{\text{UE's maximum transmit power}, \text{open/closed-loop power control factor} + f(SI)\} \quad [\text{Equation A}]$$

In Equation A, the min function is a function that selects a minimum value and the f(SI) corresponds to the function having the SI value of the eNB due to the FDR as the variable.

The f(SI) may indicate a reference transmit power of the uplink signal at which the SI can be cancelled.

The power control information may be determined by Equation B.

$$\text{Allocated power} = \min\{\text{UE's maximum transmit power}, \max\{\text{open/closed-loop power control factor}, f(SI)\}\} \quad [\text{Equation B}]$$

In Equation B, the min function is a function that selects a minimum value, the max function is a function that selects a maximum value, and the f(SI) corresponds to the function having the SI value of the eNB due to the FDR as the variable.

The power control information may be determined by Equation C.

$$\text{Allocated power} = \min\{\text{UE's maximum transmit power}, \max\{\min\{Pr(Pt(\text{open/closed-loop power control factor} + f(SI))), b\}, a\}\}$$

In Equation C, the min function is a function that selects a minimum value, the max function is a function that selects a maximum value, the f(SI) corresponds to the function having the SI value of the eNB due to the FDR as the variable, Pt(C) indicates a transmit power for measuring IDI (inter-device interference) of neighboring UE C, Pr(X) indicates a receive power with respect to transmit power x, and a and b are variables depending on IDI magnitude of the neighboring UE C.

If a value of the Pr(Pt(open/closed-loop power control factor+f(SI))) is less than the variable a or greater than the variable b, the method may further include transmitting information indicating release of FD (full duplex) mode.

In another technical aspect of the present invention, provided herein is an evolved node B (eNB) for controlling an uplink transmit power in a wireless access system supporting full duplex radio (FDR), including: a radio frequency (RF) unit; and a processor. In this case, the processor may be configured to transmit power control information on the uplink transmit power to a user equipment (UE) and receive an uplink signal transmitted based on the power control information. In addition, the power control information may be determined according to a function having as a variable a self-interference (SI) value of the eNB due to the FDR, a maximum transmit power of the UE, and an open-loop or closed-loop power control factor.

The power control information may be determined by Equation A.

$$\text{Allocated power} = \min\{\text{UE's maximum transmit power}, \text{open/closed-loop power control factor} + f(SI)\} \quad [\text{Equation A}]$$

In Equation A, the min function is a function that selects a minimum value and the f(SI) corresponds to the function having the SI value of the eNB due to the FDR as the variable.

The f(SI) may indicate a reference transmit power of the uplink signal at which the SI can be cancelled.

The power control information may be determined by Equation B.

$$\text{Allocated power} = \min\{\text{UE's maximum transmit power}, \max\{\text{open/closed-loop power control factor}, f(SI)\}\} \quad [\text{Equation B}]$$

In Equation B, the min function is a function that selects a minimum value, the max function is a function that selects a maximum value, and the f(SI) corresponds to the function having the SI value of the eNB due to the FDR as the variable.

The power control information may be determined by Equation C.

Allocated power=min{UE's maximum transmit power,max{min{Pr(Pt(open/closed-loop power control factor+f(SI))),b},a}}

In Equation C, the min function is a function that selects a minimum value, the max function is a function that selects a maximum value, the f(SI) corresponds to the function having the SI value of the eNB due to the FDR as the variable, Pt(C) indicates a transmit power for measuring IDI (inter-device interference) of neighboring UE C, Pr(X) indicates a receive power with respect to transmit power x, and a and b are variables depending on IDI magnitude of the neighboring UE C.

If a value of the Pr(Pt(open/closed-loop power control factor+f(SI))) is less than the variable a or greater than the variable b, the processor may be configured to transmit information indicating release of FD (full duplex) mode.

DESCRIPTION OF DRAWINGS

FIG. 2 illustrates examples of frame configurations of the radio frame structure in FIG. 1

BEST MODE FOR INVENTION

Figure 1:
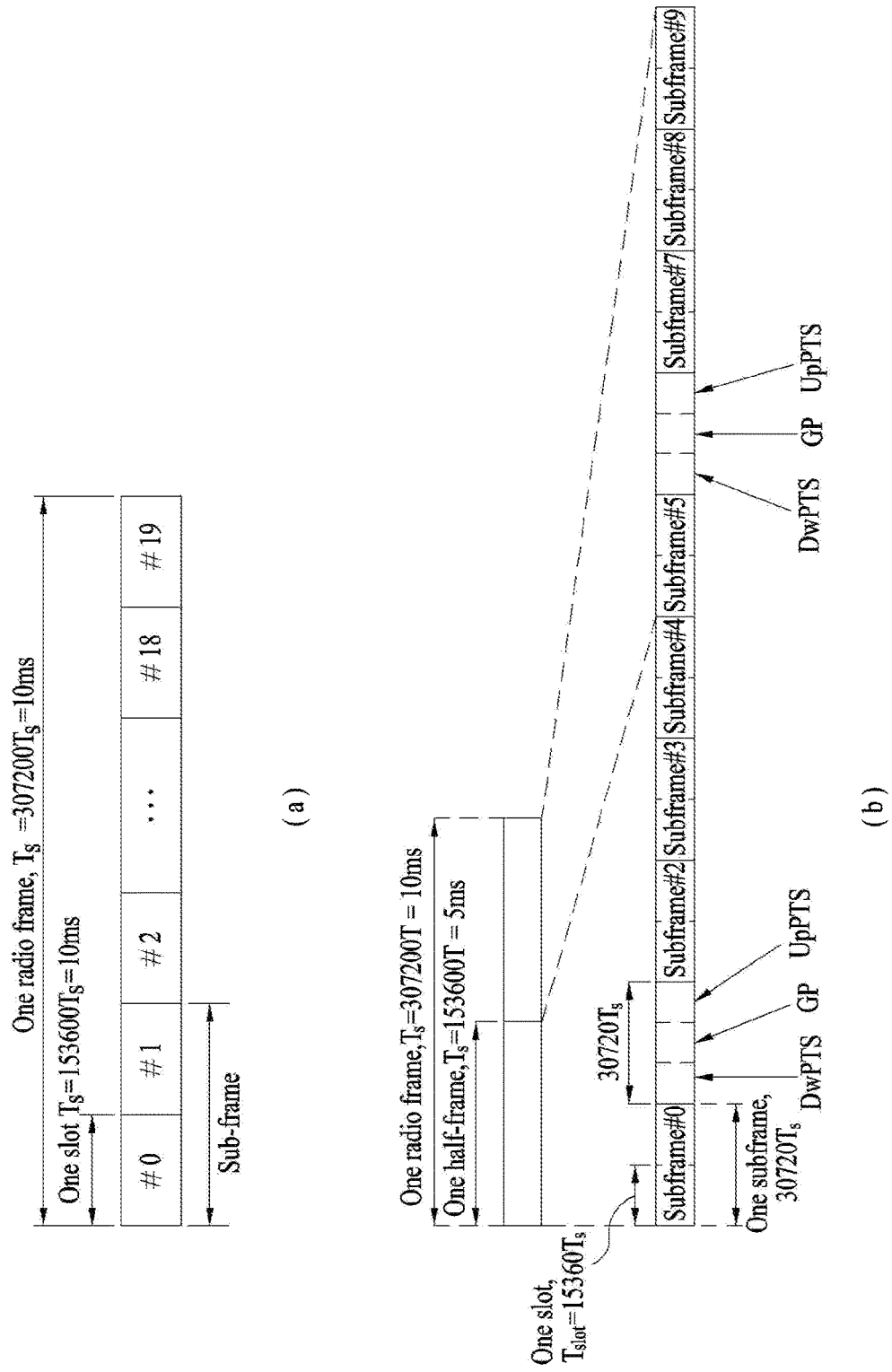
FIG. 1 illustrates a structure of a radio frame used in the 3GPP LTE system.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink.

LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

FIG. 1 illustrates a structure of a radio frame used in the 3GPP LTE system.

FIG. 1 illustrates frame structure type 2. The frame structure type 2 is applied to a time division duplex (TDD) system. One radio frame has a length of 10 ms (i.e., $T_f=307200 \cdot T_s$), including two half-frames each having a length of 5 ms (i.e., $153600 \cdot T_s$). Each half-frame includes five subframes each having a length of 1 ms (i.e., $30720 \cdot T_s$). An $i^{th}$ subframe includes $(2i)^{th}$ and $(2i+1)^{th}$ slots each having a length of 0.5 ms (i.e., $T_{slot}=15360 \cdot T_s$) where $T_s$ is a sampling time given as $T_s=1/(15 \text{ kHz} \times 2048)=3.2552 \times 10^{-8}$ (i.e., about 33 ns).

A type-2 frame includes a special subframe having three fields of downlink pilot time slot (DwPTS), guard period (GP), and uplink pilot time slot (UpPTS). The DwPTS is used for initial cell search, synchronization, or channel estimation at a UE and the UpPTS is used for channel estimation and UL transmission synchronization with a UE at an eNB. The GP is used to cancel UL interference between UL and DL, caused by the multi-path delay of a DL signal. The DwPTS, GP and UpPTS is included in the special subframe of Table 1.

FIG. 2 illustrates examples of frame configurations of the radio frame structure in FIG. 1.

In FIG. 2, 'D' represents a subframe for DL transmission, 'U' represents a subframe for UL transmission, and 'S' represents a special subframe for a guard time.

All UEs in each cell have one common frame configuration among the configurations shown in FIG. 18. That is, since a frame configuration is changed depending on a cell, the frame configuration may be referred to as a cell-specific configuration.

Figure 3:
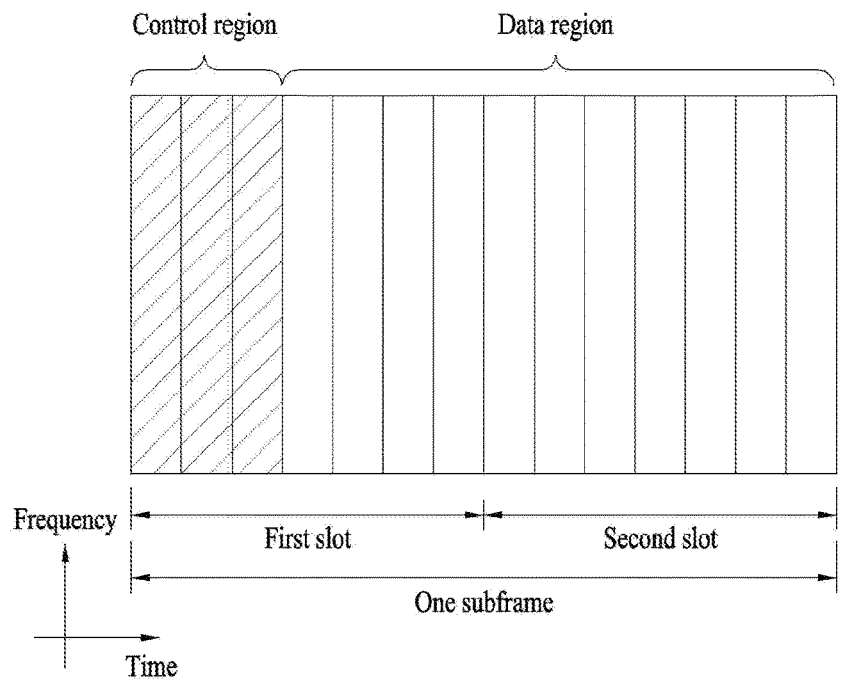
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
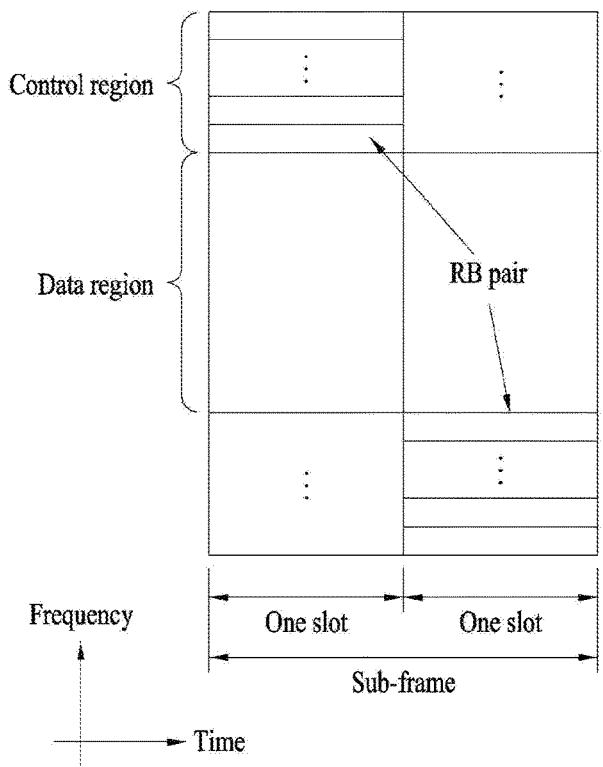
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Modeling of Multiple Input Multiple Output (MIMO) System

An MIMO system improves data transmission/reception efficiency using multiple transmit antennas and multiple receive antennas. According to the MIMO technology, entire data can be received by combining a plurality of pieces of data received through a plurality of antennas instead of using a single antenna path to receive a whole message.

The MIMO technology can be classified into a spatial diversity scheme and a spatial multiplexing scheme. Since the spatial diversity scheme increases transmission reliability or a cell radius through a diversity gain, it is suitable for data transmission at a fast moving UE. According to the spatial multiplexing scheme, different data are simultaneously transmitted and thus a high data transfer rate can be achieved without increasing a system bandwidth.

Figure 5:
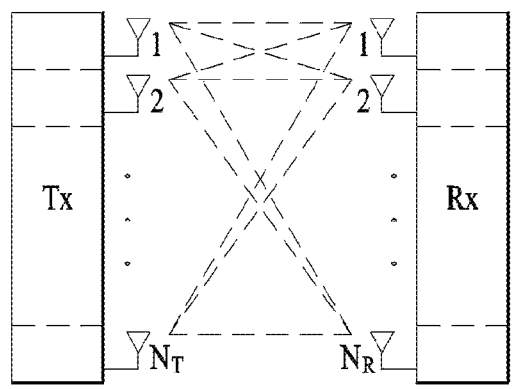
FIG. 5 is a diagram illustrating a configuration of a wireless communication system supporting multiple antennas.
Figure 5:
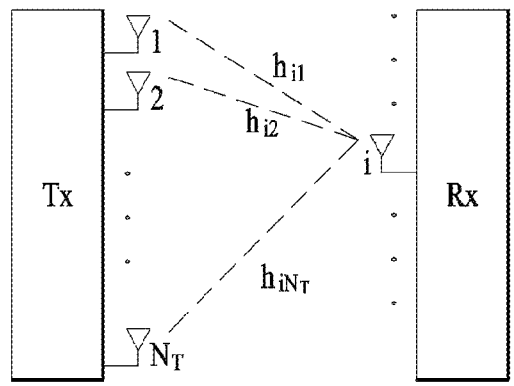

FIG. 5 is a diagram illustrating a configuration of a wireless communication system having multiple antennas. As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \qquad \text{[Equation 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

Figure 6:
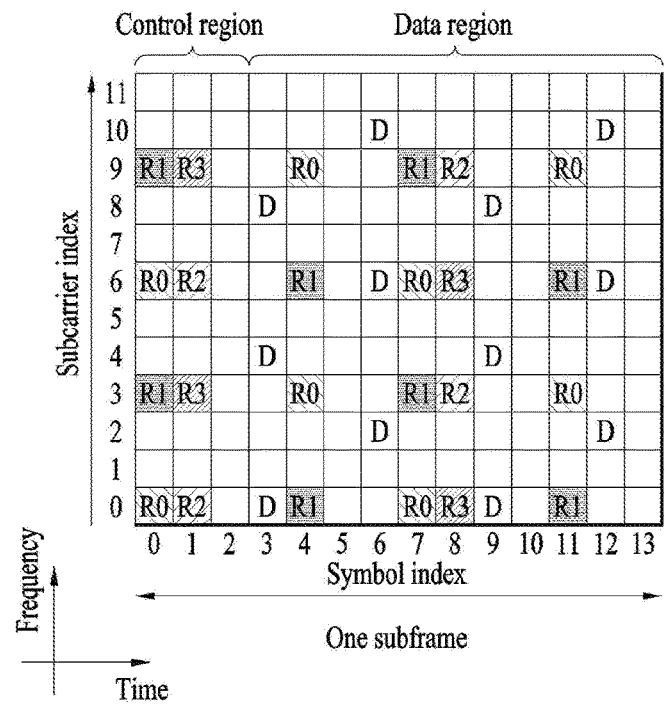
FIG. 6 is a diagram illustrating exemplary CRS and DRS patterns for one resource block.

In order to explain a communicating method in a MIMO system in detail, mathematical modeling can be represented as follows. Referring to FIG. 6, assume that $N_T$ transmitting antennas and $N_R$ receiving antennas exist, as illustrated in FIGS. 5(a) and 5(b).

First of all, regarding a transmission signal, if there are $N_T$ transmitting antennas, $N_T$ maximum transmittable informations exist. Hence, the transmission information may be represented by the vector shown in Equation 2.

$$S = [s_1, s_2, \ldots, s_{N_T}]$$ [Equation 2]

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Equation 3.

$$\hat{s} = [\hat{s}_1, \hat{s}_2, \ldots, \hat{s}_{N_T}] = [P_1 s_1, P_2 s_2, \ldots, P_{N_T} s_{N_T}]$$ [Equation 3]

And, $\hat{s}$ may be represented as Equation 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Let us consider a case of configuring $N_T$ transmitted signals $x_1, x_2, \ldots, x_{N_T}$, which are actually transmitted, by applying a weight matrix W to a transmission power adjusted information vector $\hat{s}$. The weight matrix W serves to appropriately distribute the transmission information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

In Equation 5, $w_{ij}$ denotes a weight between an $i^{th}$ transmit antenna and $j^{th}$ information. W is also called a precoding matrix.

The transmitted signal x may be differently processed according to two schemes (for example, spatial diversity scheme and spatial multiplexing scheme). In case of the spatial multiplexing scheme, different signals are multiplexed and the multiplexed signal is transmitted to a receiver such that elements of information vector(s) have different values. In case of the spatial diversity scheme, the same signal is repeatedly transmitted through a plurality of channel paths such that elements of information vector(s) have the same value. A combination of the spatial multiplexing scheme and the spatial diversity scheme may be considered. That is, the same signal may be, for example, transmitted through three transmit antennas according to the spatial diversity scheme and the remaining signals may be transmitted to the receiver using the spatial multiplexing scheme.

If the $N_R$ receive antennas are present, respective received signals $y_1, y_2, \ldots, y_{N_R}$ of the antennas are expressed as follows.

$$y = [y_1, y_2, \ldots, y_{N_R}]^T$$ [Equation 6]

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) illustrates channels from the $N_T$ transmit antennas to the receive antenna i. The channels may be combined and expressed in the form of a vector and a matrix. In FIG. 5(b), the channels from the $N_T$ transmit antennas to the receive antenna i may be expressed as follows.

$$h_i^T = [h_{i1}, h_{i2}, \ldots, h_{iN_T}]$$ [Equation 7]

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix}$$ [Equation 8]

An Additive White Gaussian Noise (AWGN) is added to the actual channels after a channel matrix H. The AWGN $n_1, n_2, \ldots, n_{N_R}$ respectively added to the $N_R$ receive antennas may be expressed as follows.

$$n = [n_1, n_2, \ldots, n_{N_R}]^T$$ [Equation 9]

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$ [Equation 10]

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows or columns, which are independent of each other. Accordingly, the rank of the matrix is not greater than the number of rows or columns. The rank rank(H) of the channel matrix H is restricted as follows.

$$\mathrm{rank}(H) \leq \min(N_T, N_R) \qquad \text{[Equation 11]}$$

In MIMO transmission, the term 'rank' denotes the number of paths for independently transmitting signals, and the term 'number of layers' denotes the number of signal streams transmitted through each path. In general, since a transmitting end transmits layers corresponding in number to the number of ranks used for signal transmission, rank has the same meaning as the number of layers unless otherwise specified.

Reference Signal (RS)

Since a packet is transmitted on a radio channel in a wireless communication system, a signal may be distorted in the course of transmission. A receiving end needs to correct the distorted signal using channel information to receive a correct signal. To enable the receiving end to obtain the channel information, a transmitting end transmits a signal known to both a transmitting end and the receiving end. The receiving end obtains the channel information based on the degree of distortion occurring when the signal is received on the radio channel. Such a signal is called a pilot signal or a reference signal.

When data is transmitted and received through multiple antennas, the receiving ends needs to be aware of a channel state between each transmit antenna and each receive antenna to receive the data correctively. Accordingly, each transmit antenna should have a separate reference signal.

In a mobile communication system, reference signals (RSs) are mainly classified into two types according to the purposes thereof: an RS for channel information acquisition and an RS for data demodulation. Since the former RS is used to allow a UE to acquire DL channel information, it should be transmitted over a wide band. In addition, even a UE which does not receive DL data in a specific subframe should be receive and measure the corresponding RS. Such an RS is also used for measurement of handover. The latter RS is transmitted when an eNB sends a resource in downlink. The UE may perform channel estimation by receiving this RS, thereby performing data modulation. Such an RS should be transmitted in a region in which data is transmitted.

The legacy 3GPP LTE (e.g., 3GPP LTE release-8) system defines two types of downlink RSs for unicast services: a common RS (CRS) and a dedicated RS (DRS). The CRS is used for acquisition of information on a channel state, measurement of handover, etc. and may be referred to as a cell-specific RS. The DRS is used for data demodulation and may be referred to as a UE-specific RS. In the legacy 3GPP LTE system, the DRS is used for data demodulation only and the CRS can be used for both purposes of channel information acquisition and data demodulation.

The CRS, which is cell-specific, is transmitted across a wideband in every subframe. Depending on the number of transmit antennas of the eNB, it is possible to transmit CRSs for maximum four antenna ports. For instance, when the number of the transmit antennas of the eNB is two, CRS for antenna ports 0 and 1 are transmitted. If the eNB has four transmit antennas, CRSs for antenna ports 0 to 3 are transmitted.

FIG. 6 illustrates CRS and DRS patterns for one resource block in a system where an eNB has four transmit antennas (in case of a normal CP, one resource block includes 14 OFDM symbols in the time domain×12 subcarriers in the frequency domain). In FIG. 6, REs expressed as 'R0', 'R1', 'R2' and 'R3' respectively represent the positions of CRSs for antenna ports 0, 1, 2, and 3 and REs expressed as 'D' represent the positions of DRSs defined in the LTE system.

The LTE-A system, which is an evolved version of the LTE system, can support a maximum of 8 transmit antennas on downlink. Accordingly, RSs for up to 8 transmit antennas should be supported. Since downlink RSs are defined for up to four antenna ports in the LTE system, RSs for added antenna ports should be defined when the eNB has more than 4 up to 8 downlink transmit antennas. As the RSs for a maximum of 8 transmit antenna ports, both RSs for channel measurement and RSs for data demodulation should be considered.

One important consideration in design of the LTE-A system is backward compatibility. The backward compatibility refers to support of a legacy LTE UE that can properly operate in the LTE-A system. In terms of RS transmission, if RSs for up to 8 transmit antenna ports are added in a time-frequency region in which CRSs defined in LTE standards are transmitted in every subframe over all bands, RS overhead excessively increases. Hence, when RSs for up to 8 antenna ports are designed, reduction of RS overhead should be considered.

The RSs newly introduced in the LTE-A system may be categorized into two types. One is a channel state information RS (CSI-RS) for channel measurement in order to select a transmission rank, a modulation and coding scheme (MCS), a precoding matrix index (PMI), etc. and the other is a modulation RS (DM RS) used for demodulating data transmitted through a maximum of 8 transmit antennas.

The CSI-RS for channel measurement is mainly designed for channel measurement as opposed to the CRS in the legacy LTE system, used for channel measurement and handover measurement and simultaneously for data demodulation. Obviously, the CSI-RS may also be used for handover measurement. Since the CSI-RS is transmitted only for information acquisition on a channel state, the CSI-RS does not need to be transmitted in every subframe unlike the CRS in the legacy LTE system. Hence, to reduce CRS-RS overhead, the CSI-RS may be designated to be intermittently (e.g. periodically) transmitted in the time domain.

If data is transmitted in a certain downlink subframe, a dedicated DM RS is transmitted to a UE in which data transmission is scheduled. A DM RS dedicated to a specific UE may be designed such that the DM RS is transmitted only in a resource region scheduled for the specific UE, that is, only in a time-frequency region carrying data for the specific UE.

Figure 7:
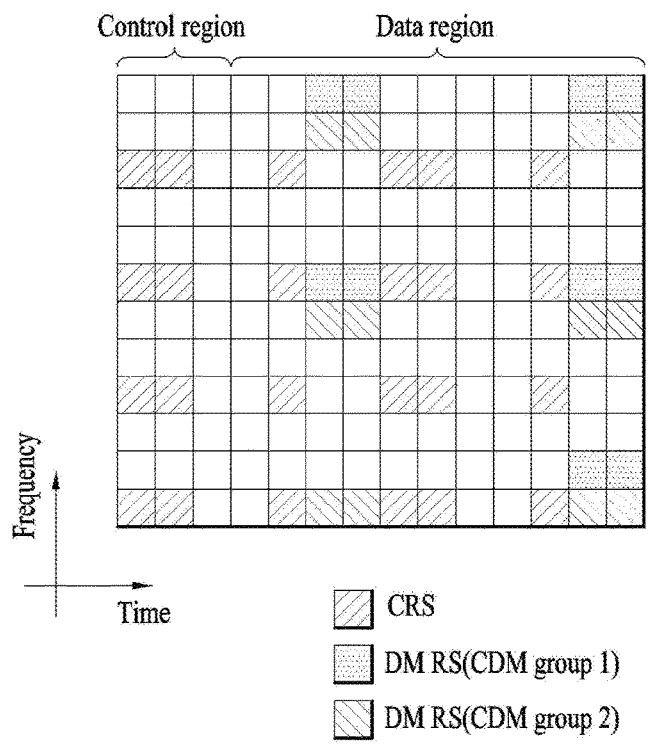
FIG. 7 is a diagram illustrating an example of a DM RS pattern defined in the LTE-A system.

FIG. 7 is a diagram illustrating an example of a DM RS pattern defined in the LTE-A system. FIG. 7 shows the positions of REs carrying DM RSs in one resource block in which downlink data is transmitted (in the case of the normal CP, one resource block includes 14 OFDM symbols in the time domain×12 subcarriers in the frequency domain). The DM RSs may be transmitted for four antenna ports (antenna port indices 7, 8, 9 and 10), which are additionally defined in the LTE-A system. The DM RSs for different antenna ports may be distinguished with each other by different frequency resources (subcarriers) and/or different time resources (OFDM symbols) at which they are located. (i.e., the DM RSs may be multiplexed according to an FDM and/or TDM scheme). In addition, the DM RSs for different antenna ports located on the same time-frequency resources may be distinguished by orthogonal codes (i.e., the DM RSs may be multiplexed according to a CDM scheme). In the example of FIG. 7, DM RSs for antenna ports 7 and 8 may be located at REs expressed as DM RS CDM group 1 and they may be multiplexed by orthogonal codes. Similarly, in the example of FIG. 7, DM RSs for antenna ports 9 and 10 may be located at REs expressed as DM RS CDM group 2 and they may be multiplexed by orthogonal codes.

Figure 8:
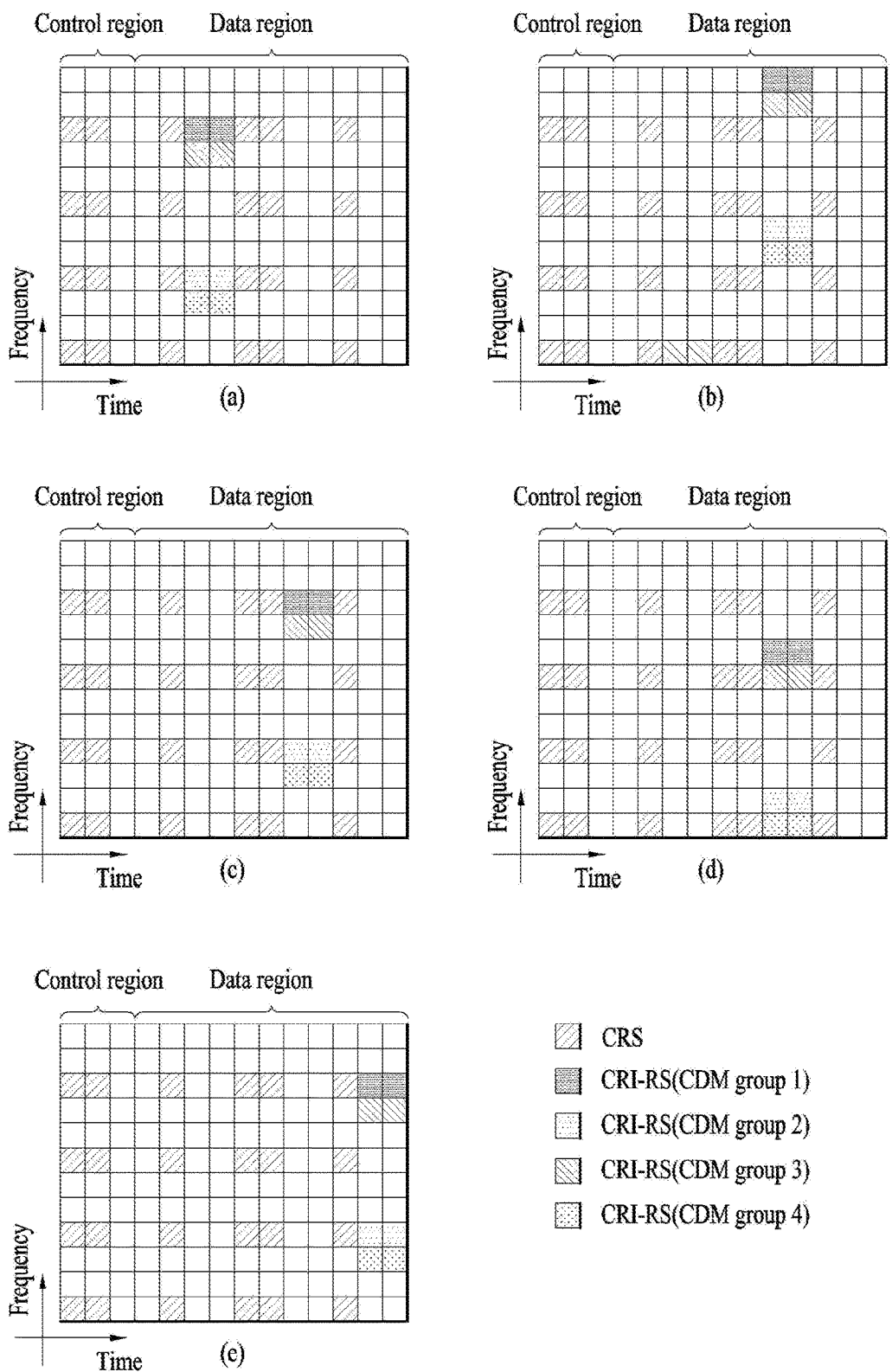
FIG. 8 is a diagram illustrating examples of a CSI-RS pattern defined in the LTE-A system.

FIG. 8 is a diagram illustrating examples of a CSI-RS pattern defined in the LTE-A system. FIG. 8 shows the positions of REs carrying CSI-RSs in one resource block in which downlink data is transmitted (in the case of the normal CP, one resource block includes 14 OFDM symbols in the time domain×12 subcarriers in the frequency domain). One of the CSI-RS patterns shown in FIGS. 8(*a*) to 8(*e*) may be used in any downlink subframe. The CSI-RSs may be transmitted for 8 antenna ports (antenna port indices 15, 16, 17, 18, 19, 20, 21, and 22) additionally defined in the LTE-A system. The CSI-RSs for different antenna ports may be distinguished with each other by different frequency resources (subcarriers) and/or different time resources (OFDM symbols) at which they are located. (i.e., the CSI-RSs may be multiplexed according to the FDM and/or TDM scheme). The CSI-RSs for different antenna ports located on the same time-frequency resources may be distinguished by orthogonal codes (i.e. The CSI-RSs may be multiplexed according to the CDM scheme). In the example of FIG. 8(*a*), CSI-RSs for antenna ports 15 and 16 may be located at REs expressed as CSI-RS CDM group 1 and they may be multiplexed by orthogonal codes. In the example of FIG. 8(*a*), CSI-RSs for antenna ports 17 and 18 may be located at REs expressed as CSI-RS CDM group 2 and they may be multiplexed by orthogonal codes. In the example of FIG. 8(*a*), CSI-RSs for antenna ports 19 and 20 may be located at REs expressed as CSI-RS CDM group 3 and they may be multiplexed by orthogonal codes. In the example of FIG. 8(*a*), CSI-RSs for antenna ports 21 and 22 may be located at REs expressed as CSI-RSs CDM group 4 and they may be multiplexed by orthogonal codes. The same principle as described with reference to FIG. 8(*a*) may be applied to FIGS. 8(*b*) to 8(*e*).

Figures 9, 10:
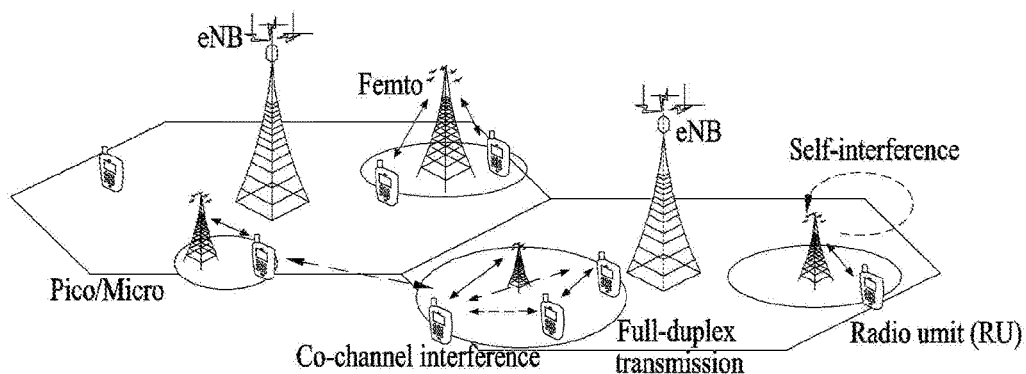
FIG. 9 is a diagram illustrating an example of a zero-power (ZP) CSI-RS pattern defined in the LTE-A system.
FIG. 10 illustrates an example of a system supporting FDR.

FIG. 9 is a diagram illustrating an example of a zero-power (ZP) CSI-RS pattern defined in the LTE-A system. There are two main purposes of a ZP CSI-RS. First of all, the ZP CSI-RS is used for CSI-RS performance improvement. That is, in order to improve performance of measurement for CSI-RS of a different network, a network may perform muting on a CSI-RS RE of the different network and then inform a UE in the corresponding network of the muted RE by setting it to the ZP CSI-RS in order for the UE to perform rate matching correctly. Second, the ZP CSI-RS is used for the purpose of measuring interference for a CoMP CQI calculation. That is, if a certain network performs muting on a ZP CSI-RS RE, a UE can calculate a CoMP CQI by measuring interference from the ZP CSI-RS.

The RS patterns of FIGS. 6 to 9 are purely exemplary and various embodiments of the present invention is not limited to a specific RS pattern. In other words, even when an RS pattern different from the RS patterns of FIGS. 6 to 9 is defined and used, the various embodiments of the present invention can be applied in the same manner.

Full Duplex Radio (FDR) Transmission

The FDR system means a system that enables a transmitting device to simultaneously perform transmission and reception through the same resource. For instance, an eNB or a UE supporting the FDR may perform transmission by dividing uplink/downlink into frequency/time without duplexing.

FIG. 10 illustrates an example of a system supporting FDR.

Referring to FIG. 10, there are two types of interference in the FDR system.

The first type of interference is self-interference (SI). The SI means that a signal transmitted from a transmit antenna of an FDR device is received by a receive antenna of the corresponding FDR device, thereby acting as interference. Such SI can be referred to as intra-device interference. In general, a self-interference signal is received with high power compared to a desired signal. Thus, it is important to cancel the SI through interference cancellation.

The second type of interference is inter-device interference (IDI). The IDI means that a UL signal transmitted by an eNB or a UE is received by a neighboring eNB or another UE, thereby acting as interference.

The SI and the IDI occurs only in the FDR system due to the same resource used in a cell. Since half-duplex (e.g., FDD, TDD, etc.) in which frequency or time is allocated for each of uplink and downlink has been used in the legacy communication system, interference has not been occurred between uplink and downlink. However, in an FDR transmission environment, since the same frequency/time resource is shared between uplink and downlink, the above-mentioned interference occurs.

Figure 11:
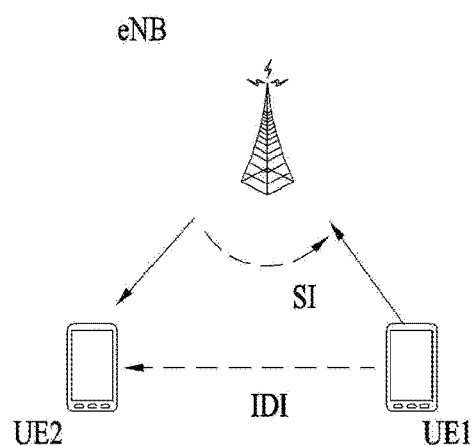
FIG. 11 is a conceptual diagram illustrating SI and IDI caused when an eNB uses FD mode on the same resource.

FIG. 11 is a diagram illustrating the concepts of SI and IDI caused when an eNB uses FD mode (i.e., mode for simultaneously performing transmission and reception using the same frequency) on the same resource.

Although FIG. 11 shows an simple example of SI in one eNB and IDI between two UEs for convenience of description, the present invention is not limited to a subject in which the SI or IDI occurs, the number of UEs, and operation mode (e.g., FD or HD mode) of a UE.

Even though interference from a neighboring cell occurring in the legacy system is also present in the FDR system, it is not described in the present invention.

Power Control

To support a prescribed data transfer rate, power control for a transmit power is necessary in the mobile communication system. Specifically, a too high power may causes unnecessary interference whereas a too low power may cause a data transmission error and increase the number of times of retransmission, thereby causing a transmission delay and a low throughput.

To guarantee a sufficient transmission quality, an eNB may increase a transmit power of a wireless user equipment located at a cell boundary so that the wireless user equipment located apart from the eNB is allowed to have the high transmit power compared to a wireless user equipment close to the eNB. However, a signal transmitted with the high transmit power may cause interference to a neighboring cell. Thus, a transmit power should be controlled to have a value as minimum as possible and this is referred to as the power control.

The power control technology can be divided into UL power control and DL power control.

The UL power control refers to control of a transmit power of a UE and it is devised to enable every UE to maintain satisfactory call quality and to have maximum capability. According to the UL power control, a transmit power of a mobile UE is controlled such that transmit powers from individual UEs are set equal to each other and thus a signal-to-noise ratio is minimized.

The DL power control refers to control of a transmit power of an eNB (i.e., mitigation of interference between mobile communication cells). Specifically, according to the DL power control, a UE located apart from an eNB is allowed to have a high transmit power but a UE close to the eNB has a low transmit power.

Further, the UL power control can be divided into open-loop power control and closed-loop power control.

According to the open-loop power control scheme, a loop is not formed between the mobile UE and the eNB and transmit power control is performed mainly by the mobile UE. Specifically, the transmit power control is performed on the assumption that forward power loss is equal to reverse power loss.

The closed-loop power control scheme means a scheme of correcting a power control error in the open-loop scheme. According to the closed-loop power control, the eNB determines information related to the power control and informs the UE of the determined information at a predetermined period Power control methods used in the LTE system can be found in TS 36.213 and equations and concept of the UL power control are as follows.

A power of a PUSCH can be calculated according to Equation 12 below.

$$P_{PUSCH}(i)=\min\{P_{CMAX}, 10 \log_{10}(M_{PUSCH}(i))+P_{O\_PUSCH}(j)+\alpha(j)\cdot PL+\Delta_{TF}(i)+f(i)\} \quad \text{[Equation 12]}$$

In Equation 12, a unit of $P_{PUSCH}(i)$ corresponds to dBm. In addition, i indicates a time index (or subframe index), $P_{CMAX}$ indicates a maximum allowed power, and the maximum allowed power depends on the class of the UE. Moreover, $M_{PUSCH}(i)$ is determined by an allocated resource block. It has a value from 1 to 110 and is updated in each subframe. Furthermore, $\alpha(j)\cdot PL$ is used for path-loss compensation, where PL indicates downlink path-loss measured by the UE and a indicates a scaling value equal to or less than 1, which is expressed as a 3-bit value. If α is equal to 1, it means that the path-loss is completely compensated. Otherwise, if α is less than 1, it means that the path-loss is partially compensated.

$P_{O\_PUSCH}(j)$ can be calculated according to Equation 13 below.

$$P_{O\_PUSCH}(j)=P_{O\_NOMINAL\_PUSCH}(j)+P_{O\_UE\_PUSCH}(j) \quad \text{[Equation 13]}$$

$P_{O\_NOMINAL\_PUSCH}(j)$ is provided by a higher layer in a cell-specific manner and $P_{O\_UE\_PUSCH}(j)$ is provided by a higher layer in a UE-specific manner.

In Equation 12, f(i) is a UE-specific parameter that is controlled by the eNB and it is calculated according to Equation 14 below.

$$f(i)=f(i-1)+\delta_{PUSCH}(i-K_{PUSCH}) \quad \text{[Equation 14]}$$

In Equation 14, $\delta_{PUSCH}$ is a UE-specific correction value and it can be referred to as a transmit power control (TPC) command. Here, $\delta_{PUSCH}$ may be either included in the PDCCH of DCI format 0 or may be joint-coded in the PDCCH of DCI formats 3/3A along with other TPC commands.

Meanwhile, power control for a PUCCH can be defined according to Equation 15 below.

$$P_{PUCCH}(i)=\min\{P_{CMAX}, P_{O\_PUCCH}+PL+h(n_{CQI},n_{HARQ})+\Delta_{F\_PUCCH}(F)+g(i)\} \quad \text{[Equation 15]}$$

In Equation 15, a unit of $P_{PUCCH}(i)$ corresponds to dBm. In addition, $\Delta_{F\_PUCCH}(F)$ is provided by a higher layer and each $\Delta_{F\_PUCCH}(F)$ value corresponds to a PUCCH format (F) related to PUCCH format 1a. Moreover, $h(n_{CQI}, n_{HARQ})$ corresponds to a value subordinate to the PUCCH format, where $n_{CQI}$ corresponds to a number information bit for channel quality information (CQI) and $n_{HARQ}$ corresponds to an HARQ (hybrid automatic repeat request) bit number.

In the cases of PUCCH formats 1, 1a, and 1b, Equation 16 below is satisfied.

$$h(n_{CQI},n_{HARQ})=0 \quad \text{[Equation 16]}$$

Additionally, in the cases of PUCCH formats 2, 2a, and 2b and the normal cyclic prefix, Equation 17 below is satisfied.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad \text{[Equation 17]}$$

Further, in the cases of PUCCH formats 2 and the extended cyclic prefix, Equation 18 below is satisfied.

$$h(n_{CQI}, n_{HARQ}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases} \quad \text{[Equation 18]}$$

In equation 15, g(i) indicates a current PUCCH power control adjustment state and it can be calculated according to Equation 19 below.

$$g(i) = g(i-1) + \sum_{m=0}^{M-1} \delta_{PUCCH}(i-k_m) \quad \text{[Equation 19]}$$

Where $\delta_{PUCCH}$ is a UE-specific correction value and it can be referred to as a transmit power control (TPC) command. $\delta_{PUCCH}$ can be included in the in the PDCCH together with the DCI format. Alternatively, $\delta_{PUCCH}$ can be coded together with a unique PUCCH correction value for another UE and then transmitted with DCI formats 3/3A on the PDCCH. A CRC parity bit of the DCI formats 3/3A is scrambled with a TPC-PUCCH-RNTI (radio network temporary identifier).

Meanwhile, in addition to the PUCCH and the PUSCH, power control for an SRS (sounding reference signal) can be performed according to Equation 20 below.

$$P_{SRS}(i)=\min\{P_{CMAX}, P_{SRS\_OFFSET}+10 \log_{10}(M_{SRS})+P_{O\_PUSCH}(j)-\alpha(j)\cdot PL+f(i)\} \quad \text{[Equation 20]}$$

In Equation 20, $M_{SRS}$ corresponds to a bandwidth for transmitting the SRS in subframe i. In addition, f(i) indicates a current power control adjustment function for the PUSCH.

Power Control in the FDR System According to the Present Invention

Operations of an eNB and a UE related to the power control in the FDR system in which the SI and the IDI coexist at the same time will be described in the embodiments of the present invention.

A group configuration method based on the IDI can be classified into a cell-specific scheme in which a cell is a main agent and a UE-specific scheme in which a UE is a main agent. The two group configuration schemes and characteristics thereof are described in brief in Table 1. In the present invention, a power control method will be described based on the cell-specific group configuration scheme of the two group configuration schemes.

TABLE 1

|  | Cell-Specific | | UE-Specific | |
| --- | --- | --- | --- | --- |
|  | Worst case | Best case | Worst case | Best case |
| Resource sharing | Resources shared by UEs having high IDI | Resources shared by UEs having low IDI | Resources shared by UEs having high IDI | Resources shared by UEs having low IDI |
| The number of groups assigned for one UE | One UE belongs to a single group | One UE belongs to a single group | One UE belongs to a plurality of groups | One UE belongs to a plurality of groups |

Figure 12:
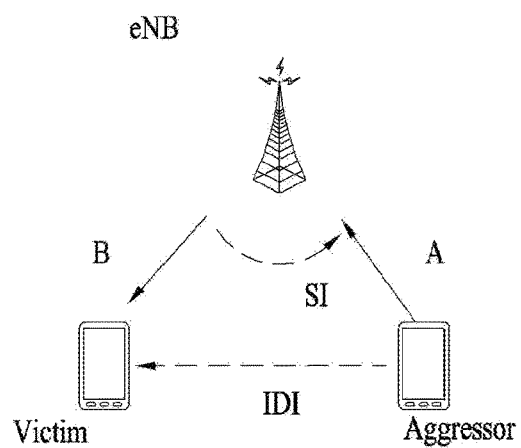
FIG. 12 illustrates a relationship between user equipments and signals according to SI and IDI caused when an eNB uses FD mode on the same resource.

FIG. 12 illustrates a relationship between user equipments and signals according to SI and IDI caused when an eNB uses FD mode on the same resource.

Referring to FIG. 12, a UE that causes the IDI is referred to as an aggressor UE and a UE that suffers from the IDI is referred to as a victim UE. In addition, a desired signal which the eNB desires to receive is referred to as signal A and another desired signal which the victim UE desires to receive is referred to as signal B.

In the FDR system, if an eNB and a UE perform the conventional power control without consideration of the SI and the IDI, it may cause the problems described in Table 2 blow. Table 2 shows a relationship between reception performance and interference that occurs in the FDR system when the conventional power control method is used.

TABLE 2

|  | Aggressor UE | | eNB | |
| --- | --- | --- | --- | --- |
|  | Transmit power increase | Transmit power decrease | Transmit power increase | Transmit power decrease |
| Interference | IDI increase | IDI decrease | SI increase | SI decrease |
| Desired signal reception performance | Signal A Increase in reception performance of eNB | Signal A Decrease in reception performance of eNB | Signal B Increase in reception performance of victim UE | Signal B Decrease in reception performance of victim UE |

For instance, if a transmit power of the aggressor UE is increased, reception performance for the signal A at the eNB is increased but reception performance for the signal B at the victim UE is decreased due to increased IDI. On the contrary, if the transmit power of the aggressor UE is decreased, the IDI is decreased but the reception performance for the signal A is also decreased.

As another example, if a power of the eNB is increased, reception performance for the signal B at the victim UE is increased but reception performance for the signal A is decreased due to increased SI.

To overcome the above-mentioned problems, for example, if the transmit powers of the aggressor UE and the eNB are simultaneously increased for the purpose of increasing reception performance for the received signals A and B, saturation occurs in an analog digital converter (ADC) in a receiver of the eNB and the SI may not be cancelled. As a result, a case in which the signal A cannot be received may occur. Although there may be interference between adjacent cells or adjacent devices, the present invention is described focusing on the SI and the IDI for convenience of explanation.

Hereinafter, a description will be given of power control methods at the eNB and the aggressor UE in the FDR system in consideration of the SI and IDI.

Since power control at the victim UE according to the present invention does not affect the occurrence of the SI and IDI, the operation of the victim UE can be considered the same as that in the conventional LTE system.

Embodiment 1

First of all, uplink power control at the aggressor UE will be described.

The power control for the PUSCH (Equation 12), the PUCCH (Equation 15), and the SRS (Equation 20) in the LTE system has the following common part.

$$\text{Power allocation}=\min\{\text{UE's maximum transmit power, open/closed-loop power control factor}\} \quad \text{[Equation 21]}$$

In Equation 21, a TPC command field in a DCI format is referenced to adjust the open/closed-loop power control factor and the TPC command filed provides an offset value for a power control value. In the conventional LTE system, the open/closed-loop power control factor does not contain a factor that reflects the SI and IDI.

Embodiment 1-1

According to the power control method described in the embodiment 1-1 of the present invention, the UL power control can be performed in consideration of the SI.

$$\text{Power allocation}=\min\{\text{UE's maximum transmit power, open/closed-loop power control factor}+f(SI)\} \quad \text{[Equation 22]}$$

In Equation 22, the f(SI) corresponds to a factor for reflecting SIC (SI cancellor (or cancellation)) when a transmit power of the signal A is changed due to the power control at the aggressor UE and it indicates a reference transmit power of the signal A at which the SIC can be performed. Here, 'min' indicate a minimum value function.

Since the eNB can be aware of a DL transmission signal and a self-interference signal of the corresponding eNB, the eNB can also be aware of SIC performance. In addition, the eNB can be aware of a power of the signal A at which the signal A can be received and the SIC can also be performed.

Although an SIC capability may be determined by a transmit power of a DL signal and a cancellation algorithm, the present invention will be described based on the transmit power of the DL signal excluding the cancellation algorithm. The maximum SIC performance in accordance with the algorithm is determined, the maximum SIC performance of the present invention is expressed as max_SIC by a unit of dB.

If the SIC is performed perfectly, it can be considered as a case in which there is no SIC and thus the f(SI) is not required. However, since the perfect SIC cannot be performed in the actual environment, decoding performance for a received signal depends on a receive power of the received signal.

In addition, when the transmit power of the DL signal B of the eNB is changed, the max_SIC it not changed but the decoding performance for the received signal may be changed.

For instance, It is assumed that when the max_SIC is 110 dB [6], the transmit power of the DL signal B is 20 dBm, a noise floor is −104 dBm, and a receive power of the UL signal A received by the eNB is equal to or greater than −90 dBm (20 dBm-110 dB), the received signal can be decoded by performing the SIC. If the transmit power of the signal B is increased by 3 dBm, the receive power of the signal A needs to be 93 dBm in order to perform the SIC. The eNB instructs to increase the transmit power of the signal A by 3 dB in order to achieve the receive power of 93 dBm at the corresponding eNB. Thus, the eNB can decode the received signal. That is, the f(SI) can indicate+3 dB in consideration of the amount of increase in the transmit power of the DL signal B.

For instance, the amount of increase or decrease in the transmit power of the DL signal of the eNB can be defined according to Equation 23.

$$\Delta Pt(\text{DL signal of eNB})=Pt2(\text{DL signal of eNB})-Pt1(\text{DL signal of eNB}) \quad \text{[Equation 23]}$$

In Equation 23, Ptx indicates a transmit power of a DL signal of the eNB at a time tx.

The eNB may transmit $\Delta Pt$(DL signal of eNB) to a UE.

As another embodiment, even when the maximum SIC performance is 110 dB, actual SIC performance may be less than 110 dB according to characteristics of a transmitted signal. Thus, a margin can be given to maintain the same SCI performance even when the cancellation performance is changed.

For instance, assuming that the SIC can be performed when the received power of the signal A is equal to or greater than 92 dBm, a reference transmit power of (92 dBm+M dBm) can be used where M indicates a margin value.

$$(\text{previous reference transmit power}-\text{transmit power of signal } A)=\Delta\text{reference transmit power} \quad \text{[Equation 24]}$$

If the condition of '|$\Delta$reference transmit power|>margin' is satisfied in Equation 24 above, the eNB can transmit, to the UE, a reference transmit power shown in Equation 25.

$$\text{Reference transmit power } f(SI)=\text{previous reference transmit power}+\Delta\text{reference transmit power} \quad \text{[Equation 25]}$$

In this case, the previous reference transmit power may have an initial value of f(SI)=0.

During a time interval in which there is no downlink in the eNB, the eNB may set the margin value M to '0'

Such a signal may be transmitted through TPC commands of the DCI formats 3 and 3A and intervals for the amount of increase or decrease in the power may be determined by assigning n-bit.

If the power allocation is equal to the UE's maximum transmit power (i.e., 'power allocation=UE's maximum transmit power') due to the f(SI) in Equation 22 above, the SIC cannot be expected. Thus, in this case, the UE may instruct the use of LTE instead of the FDR. That is, a fallback mode operation may be indicated.

In the FDR system, the IDI occurs due to the use of the same resources. However, a method for preventing the occurrence of the IDI or cancelling/reducing the IDI can be considered. When the occurrence of the IDI is prevented, it may be considered as a case in which there is no effect of the IDI. Thus, Equation 22 can be expressed as Equation 26 below.

$$\text{Power allocation}=\min\{\text{UE's maximum transmit power}, \max\{\text{open/closed-loop power control factor}, f(SI)\}\} \quad \text{[Equation 26]}$$

Embodiment 1-2

In the embodiment 1-2 of the present invention, a power control method in consideration of the IDI as well as the SI will be described.

To cancel/mitigate the IDI, resource allocation can be performed according to IDI size.

That is, when a range of size of IDI caused by UE C is '$\alpha$<|IDI|<$\beta$', it means that the UE C performs transmission such that an IDI receive power of a UE to which the same resources are allocated becomes '$\alpha \sim \beta$'. In this case, if there are a plurality of UEs that use the same resources affected by the IDI, the $\alpha$ and $\beta$ can be determined by capability of cancelling/mitigating the IDI.

To measure the IDI receive power, the UE C performs transmission at a random power. That is, since a transmit power for the IDI measurement may be different from an actual transmit power for data transmission, a power shown in Equation 27 below can be defined in the present invention.

$$\text{IDI receive power}=Pr(Pt(C)) \quad \text{[Equation 27]}$$

In Equation 27, Pt(C) indicates a transmit power for the IDI measurement of the UE C and Pr(x) indicates a receive power with respect to transmit power x. When the power of the UE C is changed, the IDI becomes a function with respect to distance and thus the IDI receive power is changed as much as the amount of increase in the power of the UE C, y. That is, the relation in Equation 28 below can be established.

$$\text{IDI receive power}=Pr(Pt(C)+y \text{ dBm})=Pr(Pt(C))+y \text{ dBm} \quad \text{[Equation 28]}$$

Considering the IDI cancellation/mitigation capability, the IDI receive power in Equation 28 needs to have the range of $\alpha \sim \beta$.

Based on the above-mentioned discussion, a power control method of a UE in consideration of IDI can be established as shown in Equation 29.

$$\min\{\text{UE's maximum transmit power}, \max\{\min\{Pr(Pt(\text{open/closed-loop power control factor}+f(SI))), \beta\}, \alpha\}\} \quad \text{[Equation 29]}$$

In Equation 29, if a value of the Pr(Pt(open/closed-loop power control factor+f(SI))) is less than α or greater than β, a fallback may be indicated.

The α and β may be determined by the group configuration method in the worst or best case shown in Table 1

Figure 13:
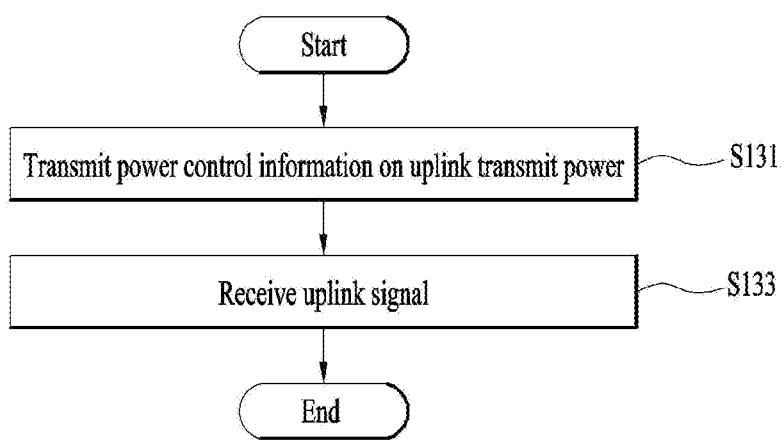
FIG. 13 illustrates a flowchart according to an embodiment of the present invention.

FIG. 13 illustrates a flowchart according to an embodiment of the present invention First, an eNB transmits power control information on an uplink transmit power to a UE in step S131.

Here, the power control information corresponds to control information in accordance with the aforementioned power control methods and details of the power control information will not be described herein.

Thereafter, the eNB receives, from the UE, an uplink signal of which a transmit power is determined based on the power control information in the step S133. Since the power control information is determined in consideration of SI or IDI, the uplink signal can be efficiently received in the FDR system according to the embodiments of the present invention.

Embodiment 2

In the embodiment 2 of the present invention, downlink power control at an eNB in an FDR system will be described.

In an eNB, an RS has the highest signal strength. To equalize a total transmit power, powers of other signals (e.g., synchronization signal, PBCH, PCFICH, PDCCH, PDSCH, PHICH) are determined on the basis of the RS.

Accordingly, power control for the RS is most important, RS power allocation can be determined as shown in Equation 30.

$$\text{RS power allocation}=\min\{\text{RS maximum transmit power},\min\{\text{power control factor},f(SI)\}\} \quad [\text{Equation 30}]$$

That is, by comparing the smaller of the power control factor and the function value depending on the SI with the RS maximum transmit power value, the smaller can be determined as the RS signal power.

The technical features mentioned in the above UL power control can be identically applied to the DL power control at the eNB and thus details of the DL power control will not be described to avoid redundancy.

Figure 14:
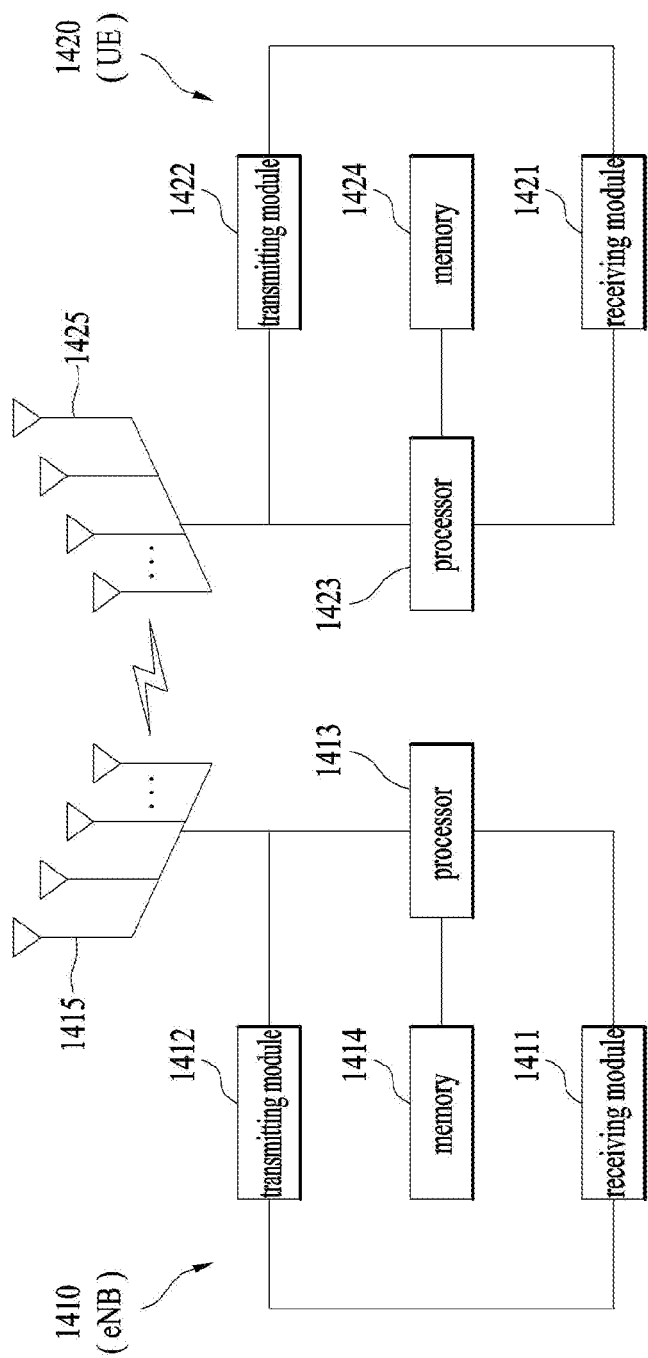
FIG. 14 illustrates an eNB and a UE applicable to an embodiment of the present invention.

FIG. 14 illustrates an eNB and a UE applicable to an embodiment of the present invention If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 14, a wireless communication system includes an eNB 1410 and a UE 1420. The eNB 1410 includes a processor 1413, a memory 1414 and an RF (radio frequency) unit 1411 and 1412. The processor 1413 can be configured to implement the procedures and/or methods proposed by the present invention. The memory 1414 is connected to the processor 1413 and stores various kinds of informations related to operations of the processor 1413. The RF unit 1416 is connected to the processor 1413 and transmits and/or receives radio or wireless signals. The UE 1420 includes a processor 1423, a memory 1424 and an RF unit 1421 and 1422. The processor 1423 can be configured to implement the procedures and/or methods proposed by the present invention. The memory 1424 is connected to the processor 1423 and stores various kinds of informations related to operations of the processor 1423. The RF unit 1421 and 1422 is connected to the processor 1423 and transmits and/or receives radio or wireless signals. The eNB 1410 and/or the UE 1420 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit may be provided within or outside the processor to exchange data with the processor through the various means known to the public As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The present invention can be applied to wireless communication devices such as a UE, a relay, an eNB and the like.

What is claimed is:

1. A method of controlling uplink transmit power by an evolved node B (eNB) in a wireless access system supporting full duplex radio (FDR), the method comprising:
   determining a reference transmit power for an uplink signal of a first user equipment (UE), the reference transmit power being a power at which self-interference (SI) of the eNB can be canceled;
   transmitting information indicating the determined reference transmit power to the first UE; and
   receiving, from the first UE, the uplink signal transmitted based on the determined reference transmit power,
   wherein the reference transmit power is changed according to a change in transmit power of a downlink signal to be transmitted to a second UE, and
   wherein the uplink transmit power is determined by Equation A:

uplink transmit power=min{UE's maximum transmit power,open/closed-loop power control factor+$f$(SI)},     [Equation A]

where the min function is a function that selects a minimum value and the f(SI) corresponds to the function of the SI value of the eNB due to the FDR.

2. The method of claim 1, wherein the uplink transmit power is determined by Equation B:

uplink transmit power=min{UE's maximum transmit power,max{open/closed-loop power control factor,$f$(SI)}}     [Equation B]

where the min function is a function that selects a minimum value, the max function is a function that selects a maximum value, and the f(SI) corresponds to the function of the SI value of the eNB due to the FDR.

3. The method of claim 1, wherein the uplink transmit power is determined by Equation C:

uplink transmit power=min{UE's maximum transmit power,max{min{$Pr(Pt$(open/closed-loop power control factor+$f$(SI))),$b$},$a$}}     [Equation C]

where the min function is a function that selects a minimum value, the max function is a function that selects a maximum value, the f(SI) corresponds to the function of the SI value of the eNB due to the FUR, Pt(C) indicates a transmit power for measuring IDI (inter-device interference) of neighboring UE C, Pr(X) indicates a receive power with respect to transmit power x, and a and b are variables depending on IDI magnitude of the neighboring UE C.

4. The method of claim 3, further comprising, if a value of the Pr(Pt(open/closed-loop power control factor+f(SI))) is less than the variable a or greater than the variable b, transmitting information indicating release of FD (full duplex) mode.

5. The method of claim 1, further comprising:
   if the transmit power of a downlink signal to be transmitted to a second UE increases by certain amount, changing the reference transmit power such that the first UE increases the uplink transmit power by the certain amount.

6. An evolved node B (eNB) for controlling an uplink transmit power in a wireless access system supporting full duplex radio (FDR), comprising:
   a radio frequency (RF) unit; and
   a processor configured to:
   determine a reference transmit power for an uplink signal of a first user equipment (UE), the reference transmit power being a power at which self-interference (SI) of the eNB can be canceled,
   transmit information indicating the determined reference transmit power to the first UE, and
   receive, from the first UE, the uplink signal transmitted based on the determined reference transmit power,
   wherein the reference transmit power is changed according to a change in transmit power of a downlink signal to be transmitted to a second UE, and
   wherein the uplink transmit power is determined by Equation A:

uplink transmit power=min{UE's maximum transmit power,open/closed-loop power control factor+$f$(SI)},     [Equation A]

where the min function is a function that selects a minimum value and the f(SI) corresponds to the function of the SI value of the eNB due to the FDR.

7. The eNB of claim 6, wherein the uplink transmit power is determined by Equation B:

uplink transmit power=min{UE's maximum transmit power,max{open/closed-loop power control factor,$f$(SI)}}     [Equation B]

where the min function is a function that selects a minimum value, the max function is a function that selects a maximum value, and the f(SI) corresponds to the function of the SI value of the eNB due to the FDR.

8. The eNB of claim 6, wherein the uplink transmit power is determined by Equation C:

uplink transmit power=min{UE's maximum transmit power,max{min{$Pr(Pt$(open/closed-loop power control factor+$f$(SI))),$b$},$a$}}     [Equation C]

where the min function is a function that selects a minimum value, the max function is a function that selects a maximum value, the f(SI) corresponds to the function of the SI value of the eNB due to the FDR, Pt(C) indicates a transmit power for measuring IDI (inter-device interference) of neighboring UE C, Pr(X) indicates a receive power with respect to transmit power x, and a and b are variables depending on IDI magnitude of the neighboring UE C.

9. The eNB of claim 8, wherein if a value of the Pr(Pt(open/closed-loop power control factor+f(SI))) is less than the variable a or greater than the variable b, the processor is configured to transmit information indicating release of FD (full duplex) mode.

11. The eNB of claim 6, if the transmit power of a downlink signal to be transmitted to a second UE increases by certain amount, the eNB changes the reference transmit power such that the first UE increases the uplink transmit power by the certain amount.

\* \* \* \* \*